US008194041B2

(12) United States Patent
Cebe

(10) Patent No.: US 8,194,041 B2
(45) Date of Patent: Jun. 5, 2012

(54) KEYPAD WITH KEY PAIRS

(75) Inventor: Chrome Manley Cebe, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

(21) Appl. No.: 12/402,022

(22) Filed: Mar. 11, 2009

(65) Prior Publication Data

US 2010/0231519 A1 Sep. 16, 2010

(51) Int. Cl.
*G06F 3/02* (2006.01)

(52) U.S. Cl. ........................................................ 345/169

(58) Field of Classification Search ........................ None
See application file for complete search history.

(56) References Cited

U.S. PATENT DOCUMENTS

| | | | | |
|---|---|---|---|---|
| 6,377,685 | B1 | 4/2002 | Krishnan | |
| 6,931,125 | B2 | 8/2005 | Smallwood | |
| 6,972,748 | B1 | 12/2005 | Lang | |
| 7,048,456 | B2 | 5/2006 | Keinonen et al. | |
| 7,087,847 | B2 * | 8/2006 | Parkinson et al. | 200/345 |
| 7,131,780 | B2 | 11/2006 | Hirsch | |
| 7,216,588 | B2 | 5/2007 | Suess | |
| 7,259,339 | B1 * | 8/2007 | Babella et al. | 200/5 A |
| 7,322,759 | B2 | 1/2008 | Rak et al. | |
| 2003/0169188 | A1 | 9/2003 | Chang | |
| 2006/0042923 | A1 * | 3/2006 | De Richecour et al. | 200/512 |
| 2006/0193468 | A1 | 8/2006 | Ahn | |
| 2007/0030249 | A1 * | 2/2007 | Griffin et al. | 345/169 |
| 2007/0195062 | A1 * | 8/2007 | Guthrie | 345/169 |
| 2009/0303185 | A1 * | 12/2009 | Larsen et al. | 345/168 |

* cited by examiner

*Primary Examiner* — Wayne Young
*Assistant Examiner* — Brian Butcher

(57) ABSTRACT

A keypad has a plurality of keys. The plurality of keys includes one or more key pairs. Each of the one or more key pairs includes physically coupled first and second keys. The physically coupled first and second keys are configured to be actuated independently of each other.

19 Claims, 5 Drawing Sheets

KEYPAD WITH KEY PAIRS

BACKGROUND

Data entry interfaces, such as keyboards or keypads, are typically used by a user for entering data into devices, such as mobile devices, e.g., mobile telephones, personal digital assistants, calculators, handheld computers, etc. Keypads for mobile devices are typically small due to the compact nature of mobile devices. As such, the individual keys of a keypad are located rather close together and have a rather small surface area, especially for keypads with 20 or more keys. This can make the keyboard difficult to operate in that a user's finger can depress more than one key at a time.

It is difficult to manufacture keys with such small surface areas in that it is difficult to form indicia on such keys that can still be readable by the user. Moreover, since all of the keys are about the same size and shape it is relatively easy to get the keys mixed up during assembly.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
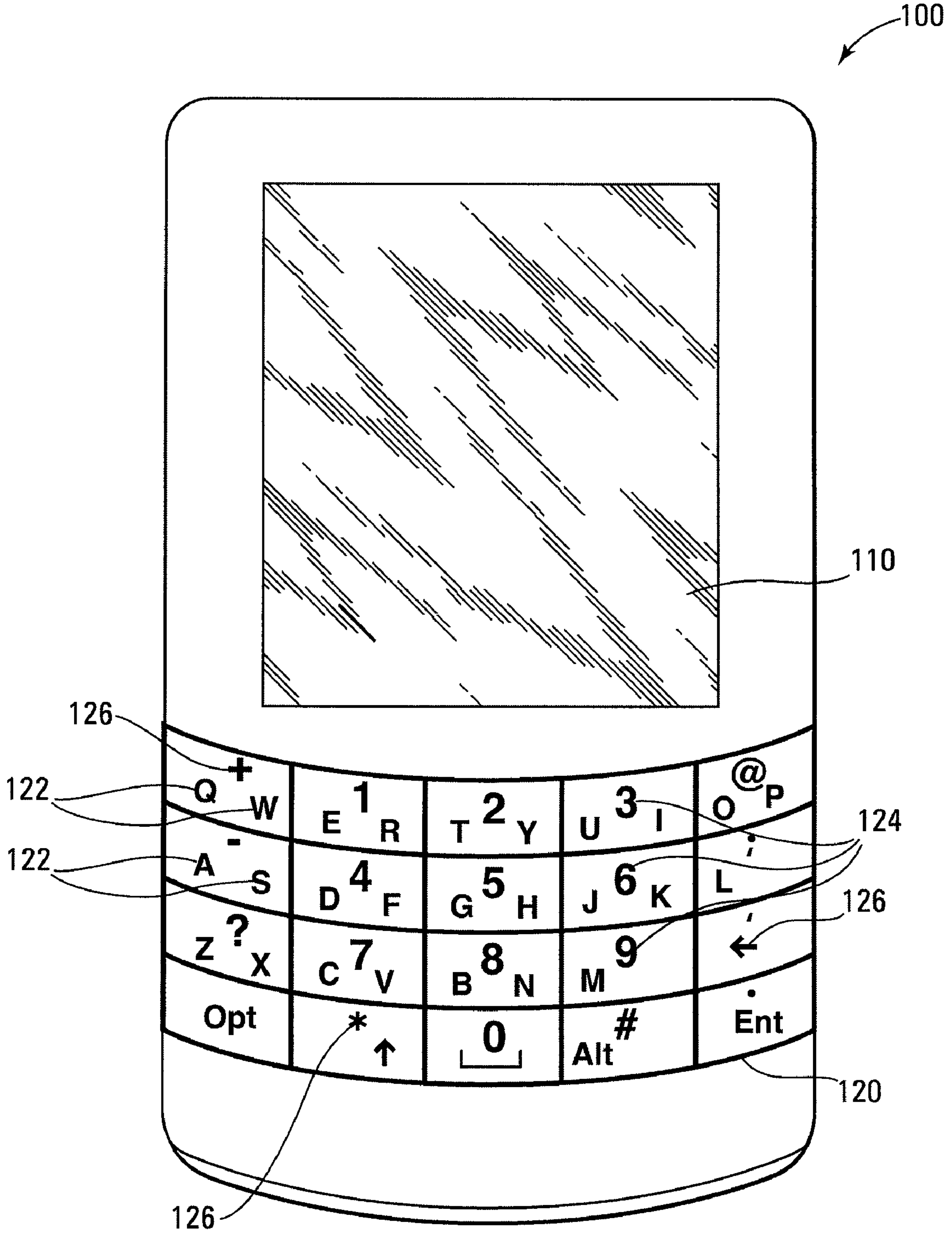
FIG. 1 is a top view illustrating an embodiment of a mobile device, according to an embodiment of the disclosure.

FIG. 1 is a top view illustrating a mobile device 100, such as a mobile telephone, a personal digital assistant, a handheld computer, etc. Mobile device 100 may have a display 110 and an input pad, such as a keypad 120. Keypad 120 includes a number of alpha characters 122, numeric characters 124, and symbols 126. For one embodiment, keypad 120 may be a QWERTY keypad, e.g., so named for the left-to-right order in which the uppermost row of alpha characters 122 is organized. Mobile device 100 may include predictive text software that acts to reduce the number of key strokes a user is required to enter to express a word, phrase, and/or expression using keypad 120.

Figure 2:
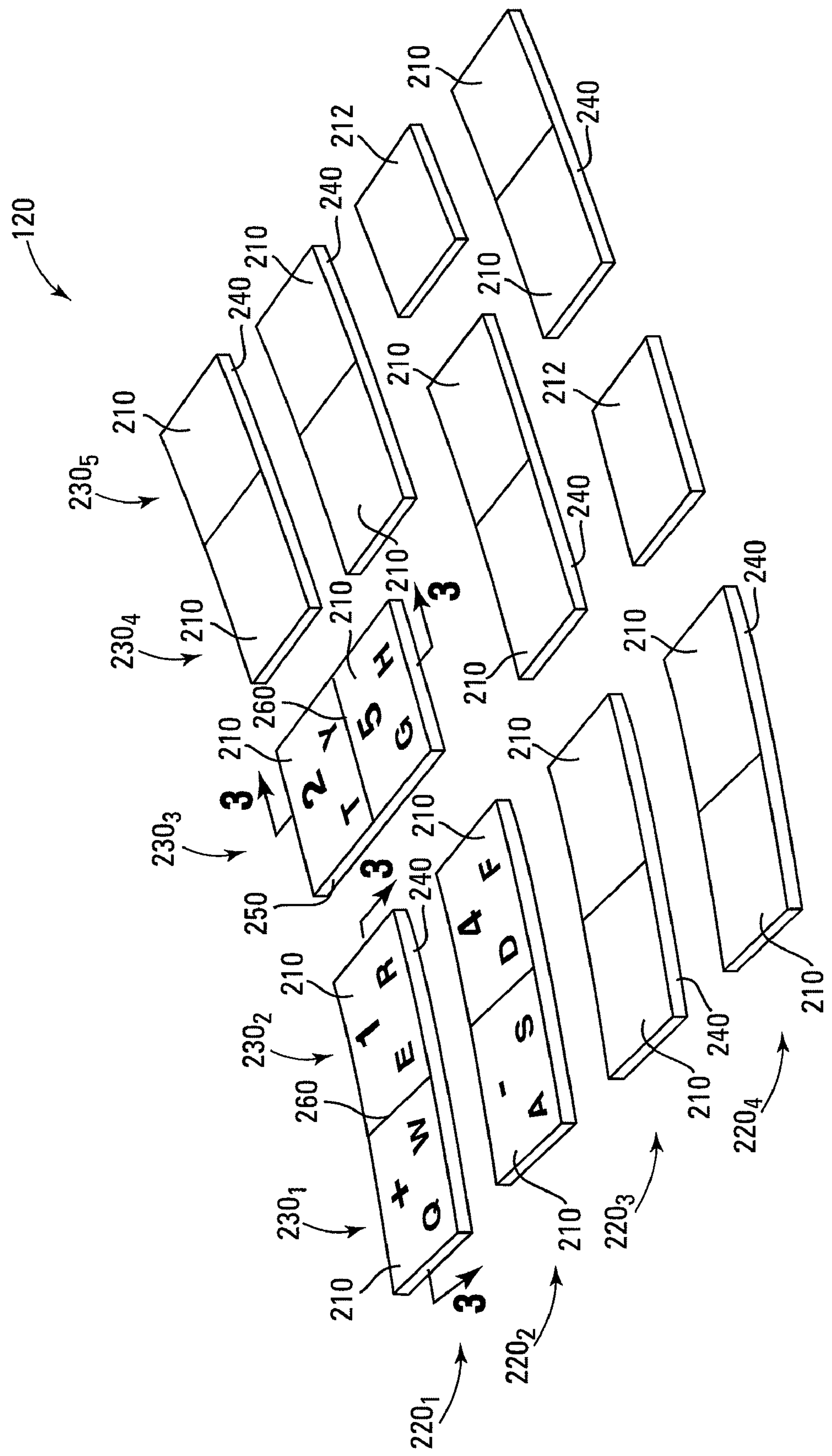
FIG. 2 is an exploded top perspective view of an embodiment of a keypad, according to another embodiment of the disclosure.

FIG. 2 is an exploded top perspective view of keypad 120. Keypad 120 has a plurality of keys organized in rows 220 (e.g., $\mathbf{220}_1$ to $\mathbf{220}_4$) and columns 230 (e.g., $\mathbf{230}_1$ to $\mathbf{230}_5$). Various combinations of alpha characters 122, numeric characters 124, and/or symbols 126 (FIG. 1) may be formed on or in an upper surface of each of the keys.

Although keypad 120 is shown to have 20 keys organized in 4 rows and 5 columns, keypad 120 may have any suitable number of keys organized in any suitable number of rows and columns. For example, keypad 120 may have 20 keys organized in 5 rows and 4 columns or 12 keys organized in 4 rows and 3 columns or 3 rows and 4 columns.

Two keys 210 respectively from successively adjacent columns 230 are combined to form one or more key pairs 240, e.g., side-by-side key pairs, as shown in FIG. 2. Two keys respectively from successively adjacent rows 220 may be combined to form one or more key pairs 250, e.g., over-under key pairs. As such, keypad 120 may include one or more key pairs 240 and one or more key pairs 250. Keypad 120 may also include one or more single stand-alone keys 212, such as the "0" key and the left-arrow key in FIG. 1.

The respective keys 210 of each key pair 240 and each key pair 250 are physically connected. Each key pair may include a groove 260 that extends part of the way through a thickness of the respective key pair and interposed between the keys 210 of the key pairs. Grooves 260 cause the key pairs to have the appearance of two single stand-alone keys.

Figure 3:
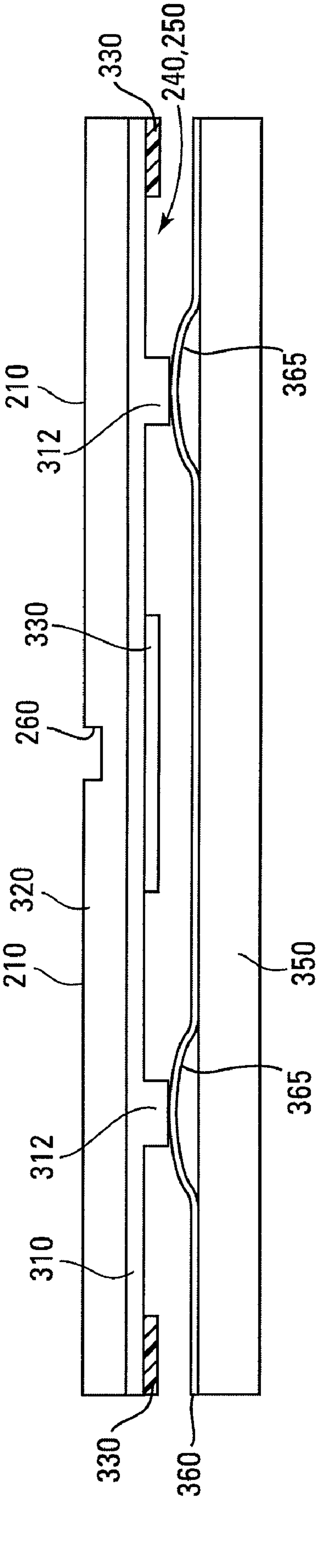
FIG. 3 is a cross-section of an embodiment of a key pair as viewed along the lines 3-3 of FIG. 2 and showing keys of the key pair in a neutral position, according to another embodiment of the disclosure.

FIG. 3 is a cross-section of a key pair 240 or a key pair 250, as viewed along the lines 3-3 of FIG. 2. The key pairs may include a plunger layer 310 that includes plungers 312 and that may formed from silicon or the like. The key pairs may further include a cap layer 320 (e.g., of plastic or the like) that overlies and is in direct contact with the plunger layer 310. Cap layer 320 may be adhered to plunger layer using an adhesive. The groove 260 is formed in the upper surface of cap layer 320.

The respective keys 210 of each key pair share the plunger layer 310 and cap layer 320 of the respective key pair. In other words, each key pair has one continuous plunger layer 310 and one continuous cap layer 320 that are common to each key 210 of the key pair, as shown in FIG. 3.

Figure 4:
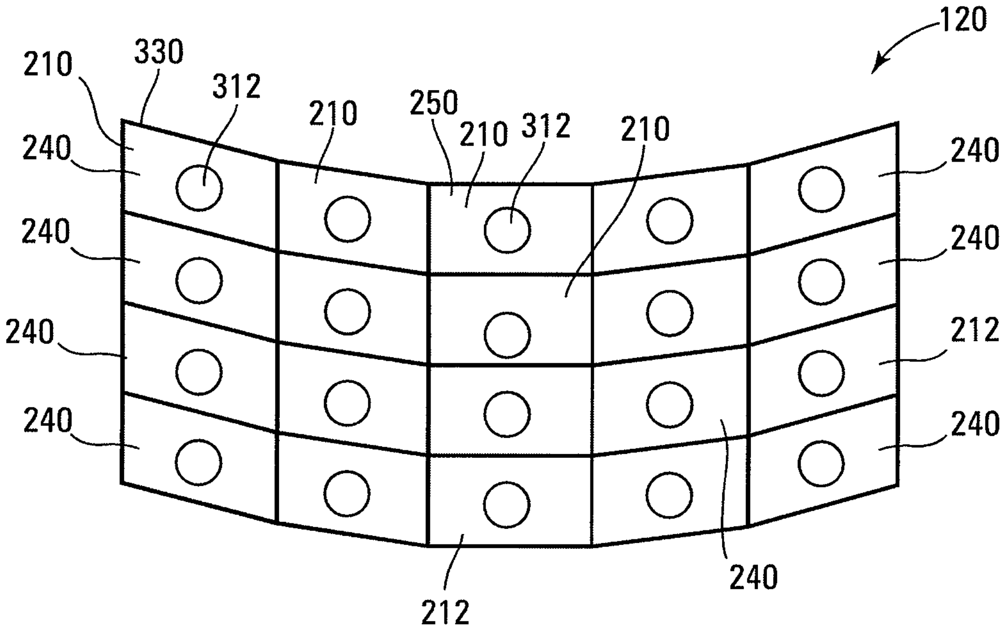
FIG. 4 is a bottom view of an embodiment of a key pad, illustrating an example of a stiffening framework, according to another embodiment of the disclosure.

A stiffening layer, such as a stiffening framework 330, may underlie and may be in direct physical contact with the plunger layer 310. FIG. 4 is a bottom view of key pad 120 that illustrates an example of a suitable stiffening framework 330. Stiffening framework 330 may be of metal, such as spring steel. Each key 210 may be contained within a respective frame of stiffening framework 330, as shown in FIG. 4. Portions of stiffening framework 330 directly underlie and are in vertical alignment with grooves 260, as shown in FIG. 3. Stiffening framework 330 acts to maintain the key pairs and individual keys at their proper locations within key pad 120.

Although plungers 312 are shown as being generally substantially centered within their respective keys 210 in FIG. 4, the plungers 312 for some keys may not be centered within their respective keys. For example, the plunger 312 of the lower key 210 (the "5" key, see FIG. 2) of the over-under key pair 250 is off-center, e.g., is biased toward the lower boundary of the lower key 210 of the over-under key pair 250, as shown in FIG. 4.

Key pad 120 is positioned over a circuit board 350, e.g., a printed circuit board, of mobile device 100, as shown in FIG. 3. An electrically conductive layer 360, e.g., of spring steel, is formed overlying circuit board 350, e.g., such that portions thereof are in direct contact with circuit board 350. Conductive layer 360 includes domes 365, where the conductive layer 360 is physically separated from circuit board 350 at each dome 365. In other words, conductive layer 360 includes portions, corresponding to the domes 365, that are physically separated from circuit board 350. Each dome 365 is resilient so that it can be collapsed by the plunger of a key when a force is applied to the key, causing the key to move, and can return to its original shape when the force is released from the key.

When the key pair is positioned over a circuit board 350, plungers 312 may directly overlie and may be vertically aligned with domes 365, as shown in FIG. 3. Plungers 312 may be maintained in direct contact with the respective domes 365, as shown in FIG. 3. Alternatively, a slight gap (e.g., an air gap) may separate each plunger 312 from its respective dome 365.

Note that each single stand-alone key 212 has substantially the same cross-section as shown in FIG. 3 for each of the keys 210. That is, each stand-alone key 212 has a cap layer, such as cap layer 320, overlying and in direct contact with a plunger layer, such as plunger layer 310. The plunger layer has a plunger, such as plunger 312, that may overlie and may be vertically aligned with a dome 365. The plunger may be maintained in contact with the dome 365 or separated from the dome 365 by a gap, such as an air gap. Each stand-alone key 212 may be contained within a frame of stiffening framework 330.

Each key 210 of a key pair or each stand-alone key 212 that is contained within a respective frame of framework 330 includes a portion of plunger layer 310 and a portion of the cap layer 320 that directly overlies the respective portion of plunger layer 310, as shown in FIG. 3. Stiffening framework 330 acts to stiffen the portions of plunger layer 310 that are in contact with framework 330 and the portions of cap layer 320 that directly overlie the respective stiffened portions of plunger layer 310. This means that each key 210 or 212 is relatively flexible compared to stiffened portions surrounding the respective key 210 or 212 so that the respective key 210 or 212 can be moved (e.g., actuated) in response to a force applied to the upper surface of the respective key 210 or 212.

Figure 5:
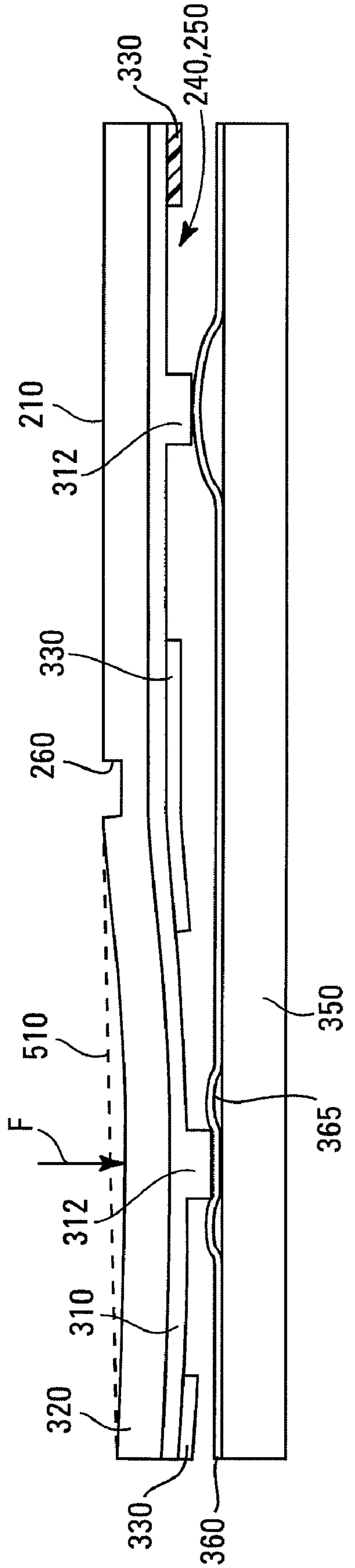
FIG. 5 is the cross section of FIG. 3, but showing one of the keys in an activated state, according to another embodiment of the disclosure.

When a force F is applied, e.g., by a user's finger, to an upper surface of either a stand-alone key 212 or a key 210 of a key pair, portions of framework 330 are deflected in the direction of the force F toward circuit board 350, as shown in FIG. 5 for a key 210 of either key pair 240 or 250. Moreover, an upper surface of the key 210 may deform or flex (e.g., bow) from its neutral position (indicated by dashed line 510 for a key 210 in FIG. 5) in response to the force F.

The neutral position of a key 210 is also shown in FIG. 3 and at the right in FIG. 5 and is defined as when the key in its un-pressed position, e.g., in a non-activated state. The upper surface of a key 210 may become concave when exposed to the force F. In particular, the portion of plunger layer 310 and the portion of cap layer 320 forming a key 210 deform or flex and move toward circuit board 350 relative to the portion of plunger layer 310 in contact with framework 330 and relative to the portion of cap layer 320 directly overlying the portion of plunger layer 310 in contact with framework 330.

Note that each stand-alone key 212 responds to a force F applied thereto in substantially the same way, as shown at the left of FIG. 5 for a key 210 and as described above in conjunction with FIG. 5. That is, an upper surface of each stand-alone key 212 may deform or flex (e.g., bow) from its neutral position (indicated by dashed line 510 for a key 210 in FIG. 5) in response to the force F. The neutral position of a key 212 is defined as when the key in its un-depressed position. The upper surface of a key 212 may become concave when exposed to the force F. In particular, the portion of plunger layer 310 and the portion of cap layer 320 forming a key 212 deform or flex and move toward circuit board 350 relative to the portion of plunger layer 310 in contact with framework 330 and relative to the portion of cap layer 320 directly overlying the portion of plunger layer 310 in contact with framework 330.

When a key 210 is actuated in response to the force F, the plunger 312 of that key 210 moves against the respective dome 365 causing the respective dome 365 to collapse into contact with circuit board 350, as shown in FIG. 5. When the key is in the position corresponding to a collapsed dome, as shown at the left of FIG. 5, the key is activated or is in an active state, and the collapsed dome is in an active state.

Collapsing the dome 365 into contact with circuit board 350 may cause the dome 365 to complete a circuit of circuit board 350. For example, the collapsed dome 365 may close an otherwise open pair of contacts on circuit board 350. Completion of the circuit causes one of the functions indicated on the upper surface of the key to be performed. For example, the number or letter on the key 210 may be input, or the action indicated on the key 210 may be performed. Removing the force F causes the key and dome to return to their original positions, e.g., their neutral states.

Each stand-alone key 212 operates in substantially the same way as a key 210 when the force F is applied to the stand-alone key 212. That is, the plunger of the stand-alone key 212 moves against the respective dome 365, causing the respective dome 365 to collapse into contact with circuit board 350, as shown in FIG. 5 for key 210. Collapsing the dome 365 into contact with circuit board 350 may cause the dome 365 to complete a circuit of circuit board 350. Completion of the circuit causes one of the functions indicated on the upper surface of the stand-alone key 212 to be performed. For example, the number or letter on the key 212 may be input, or the action indicated on the key 212 may be performed.

For one embodiment, height of each dome 365 is such that the length of the keystroke (e.g., about 0.3 millimeters) of a key 210 of a key pair is such that a user is unable to perceive that the key 210 is part of a key pair. A keystroke may be defined as the distance between when a key 210 is in its neutral position (as indicated by the dashed line in FIG. 5 and as shown at the right of FIG. 5 and in FIG. 3,) and when the key 210 is activated and pressing dome 365 into contact with printed circuit board 350, as shown at the left of FIG. 5. Note that the length of the keystroke of a stand-alone key 212 may be substantially the same as the length of a keystroke of a key 210, so that a user is unlikely to perceive whether the user is pressing a key 210 of a key pair or a stand-alone key 212.

Keypad 120 may include an option key (e.g. the Opt key in FIG. 1) for selecting between an option indicated on the lower portion of a key (e.g., inputting the E or R using the E/R/1 key) and an option located on the upper portion of the key (e.g., inputting the 1 using the E/R/1 key).

Although the individual keys 210 of each key pair are physically connected, the individual keys 210 of each key pair can be moved independently of each other in response to forces independently applied to the respective keys 210 by a user. The independent movement of each key 210 can activate a function of key pad 120 specific to the respective key 210.

Stand-alone keys 212 can be moved independently of each other and the individual keys 210 of each key pair in response to a force applied to a key 212 by the user. The independent movement of each stand-alone key 212 can activate a function of key pad 120 specific to the respective key 212.

For one embodiment, left-right navigation of display 110 may be incorporated into a side-by-side key pair 240. For example, continuously depressing the left key of the side-by-side key pair 240 for at least a certain time may cause a cursor displayed on display 110 to move left, and continuously depressing the right key for at least the certain time may cause a cursor displayed on display 110 to move right.

Similarly, up-down navigation of display 110 may be incorporated into an over-under key pair 250. For example, continuously depressing the upper key of an over-under key pair 250 for at least a certain time may cause a cursor displayed on display 110 to move upward, and continuously depressing the lower key of the over-under key pair 250 for at least the certain time may cause a cursor displayed on display 110 to move downward.

Volume control may be incorporated into either a side-by-side key pair 240 or an over-under key pair 250. For example, continuously depressing the right key of a side-by-side key pair 240 or the upper key of an over-under key pair 250 for at least a certain time may cause the volume to increase, and continuously depressing the left key of a side-by-side key pair 240 or the lower key of an over-under key pair 250 for at least the certain time may cause a decrease in volume.

The key pairs disclosed herein act to simplify keypad fabrication in that the key pairs provide a larger surface area on which to dispose indicia as compared to a single stand-alone key. The larger surface area makes the keyboard easier to operate in that it is less likely that a user's finger will depress more than one key at a time. The key pairs reduce the number of individual keys and thus simplify assembly of the keypad by reducing the number of parts. The reduced number of keys also reduces the likelihood of incorrect assembly compared to when larger numbers of single stand-alone keys are used in that for a larger number of keys the keys are more likely to get mixed up, reducing yield.

Conclusion

Although specific embodiments have been illustrated and described herein it is manifestly intended that the scope of the claimed subject matter be limited only by the following claims and equivalents thereof.

What is claimed is:

1. A keypad, comprising:

a key pair;

wherein the key pair comprises physically coupled first and second keys;

wherein the key pair comprises a plunger layer and a cap layer over the plunger layer;

wherein the plunger layer and the cap layer are shared by the first and second keys of the key pair;

wherein a first portion of the plunger layer and a first portion of the cap layer corresponds to the first key of the key pair and a second portion of the plunger layer and a second portion of the cap layer corresponds to the second key of the key pair;

wherein the plunger layer comprises first and second plungers respectively protruding from the first and second portions of the plunger layer;

wherein the first portion of the cap layer and the first portion of the plunger layer are configured to deform together in response to a force being applied to the first key of the key pair and the second portion of the cap layer and the second portion of the plunger layer are configured to deform together in response to a force being applied to the second key of the key pair; and wherein the plunger layer and the cap layer are of different materials.

2. The keypad of claim 1, further comprising one or more stand alone keys.

3. The keypad of claim 1, wherein the first and second keys are located side by side or one above the other.

4. The keypad of claim 1, wherein the key pair further comprises a groove formed in an upper surface of the cap layer and interposed between the first and second keys.

5. The keypad of claim 1, wherein the first portion of the cap layer and the first portion of the plunger layer are configured to deform independently of the second portion of the cap layer and the second portion of the plunger layer in response to the forces being respectively independently applied to the first and second keys.

6. The keypad of claim 1, further comprising a stiffener underlying and in contact with the plunger layer, wherein a portion of the stiffener is located between the first and second plungers.

7. A mobile device, comprising:

a display; and a keypad, comprising:

a plurality of keys;

wherein the plurality of keys comprises a plurality of key pairs and one or more stand-alone keys;

wherein each of the plurality of key pairs comprises physically coupled first and second keys;

wherein each key pair of the plurality of key pairs comprises a plunger layer and a cap layer over the plunger layer;

wherein the plunger layer and the cap layer are shared by the first and second keys of a respective key pair;

wherein a first portion of the plunger layer and a first portion of the cap layer correspond to the first key of the respective key pair and a second portion of the plunger layer and a second portion of the cap layer correspond to the second key of the respective key pair;

wherein the plunger layer comprises first and second plungers respectively protruding from the first and second portions of the plunger layer;

wherein the first portion of the cap layer and the first portion of the plunger layer are configured to deform together in response to a force being applied to the first key of the respective key pair and the second portion of the cap layer and the second portion of the plunger layer are configured to deform together in response to a force being applied to the second key of the respective key pair; and wherein the plunger layer and the cap layer are of different materials.

8. The mobile device of claim 7, wherein the plurality of key pairs further comprises one or more first key pairs, the first and second keys of each of the one or more first key pairs located side by side.

9. The mobile device of claim 8, wherein the plurality of key pairs further comprises one or more second key pairs, the first and second keys of each of the one or more second key pairs located one above the other.

10. The mobile device of claim 7, wherein the first portion of the cap layer and the first portion of the plunger layer are configured to deform independently of the second portion of the cap layer and the second portion of the plunger layer in response to the forces being respectively independently applied to the first and second keys of the respective key pair.

11. The mobile device of claim 7, further comprising:

a conductive layer overlying a circuit board, wherein the conductive layer comprises a plurality of domes;

wherein the conductive layer is separated from the circuit board at each dome of the plurality of domes; and wherein the first and second plungers of the plunger layer of the respective key pair are respectively vertically aligned with first and second domes of the plurality of domes.

12. The mobile device of claim 11, wherein each dome of the plurality of domes is resilient, and wherein the first and second domes can be respectively collapsed by the first and second plungers, respectively protruding from the first and second portions of the plunger layer of the respective key pair, respectively moving against the first and second domes in response to the first and second portions of the plunger layer respectively deforming.

13. The mobile device of claim 7, further comprising:

a stiffening framework underlying and in contact with the plunger layer of each of the key pairs and comprising a plurality of frames;

wherein either a first or a second plunger is contained with a frame of the plurality of frames.

14. The mobile device of claim 13 further comprising:

a groove formed in an upper surface of each of the key pairs of the plurality of key pairs and interposed between the first and second keys of each of the key pairs of the plurality of key pairs;

wherein a portion of the stiffening framework directly underlies each groove.

15. A method of operating a mobile device, comprising:

respectively independently activating first and second functions of the mobile device in response to respectively independently moving first and second keys of a key pair of the mobile device;

wherein the first and second functions are respectively specific to the first and second keys of the key pair;

wherein the first and second keys of the key pair share a plunger layer and a cap layer over the plunger layer so that a first portion of the plunger layer and a first portion of the cap layer corresponds to the first key of the key pair and a second portion of the plunger layer and a second portion of the cap layer corresponds to the second key of the key pair;

wherein the plunger layer comprises first and second plungers respectively protruding from the first and second portions of the plunger layer;

wherein independently moving the first key deforms the first portion of the cap layer and the first portion of the plunger layer together;

wherein independently moving the second key deforms the second portion of the cap layer and the second portion of the plunger layer together; and wherein the plunger layer and the cap layer are of different materials.

16. The method of claim 15, further comprising:

independently activating a third function of the mobile device in response to independently moving a stand-alone key of the mobile device;

wherein the third function is express to the stand-alone key.

17. The method of claim 15, wherein the first function of the mobile device causes a volume of the mobile device to increase and the second function of the mobile device causes the volume of the mobile device to decrease.

18. The method of claim 15, wherein the first function of the mobile device causes navigation of a display of the mobile device in a first direction and the second function of the mobile device causes navigation of the display of the mobile device in a second direction.

19. The method of claim 15, wherein when the first portion of the cap layer and the first portion of the plunger layer deform together, the second portion of the cap layer and the second portion of the plunger layer do not deform and when the second portion of the cap layer and the second portion of the plunger layer deform together, the first portion of the cap layer and the first portion of the plunger layer do not deform.

* * * * *

UNITED STATES PATENT AND TRADEMARK OFFICE

CERTIFICATE OF CORRECTION

PATENT NO. : 8,194,041 B2
APPLICATION NO. : 12/402022
DATED : June 5, 2012
INVENTOR(S) : Chrome Manley Cebe It is certified that error appears in the above-identified patent and that said Letters Patent is hereby corrected as shown below:

In column 5, line 65, in Claim 2, delete “stand alone” and insert -- stand-alone --, therefor.

In column 8, line 16, in Claim 16, delete “express” and insert -- specific --, therefor.

Signed and Sealed this
Eleventh Day of December, 2012

David J. Kappos
*Director of the United States Patent and Trademark Office*